May 11, 1937.    E. H. TAYLOR ET AL    2,080,383
FRUIT AND VEGETABLE SLICER
Filed April 4, 1936
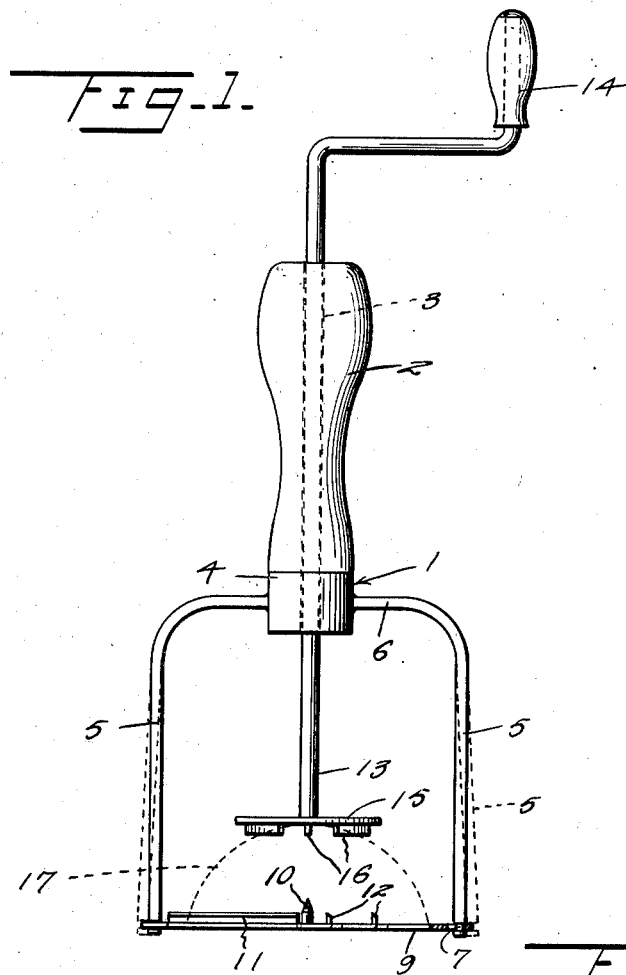
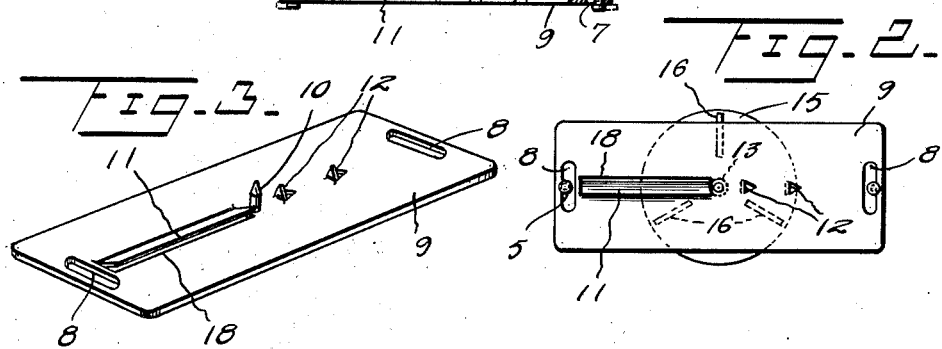
Inventors
E. H. Taylor, E. L. Pardue
S. O. Edmonds, Porter Dunlap
By Watson E. Coleman
Attorney Patented May 11, 1937

2,080,383

UNITED STATES PATENT OFFICE 2,080,383

FRUIT AND VEGETABLE SLICER

Ewing H. Taylor and Elbert L. Pardue, Nashville, Porter Dunlap, McKenzie, and Sterling O. Edmonds, Eagleville, Tenn.

Application April 4, 1936, Serial No. 72,802

4 Claims. (Cl. 146—167)

This invention relates to the class of kitchen articles and pertains particularly to a device for slicing small fruits and vegetables.

The primary object of the present invention is to provide a simple type of hand operated device by means of which vegetables and small fruits may be easily and quickly cut into slices.

Another object of the invention is to provide a fruit and vegetable slicer which is so designed that the fruit or vegetable may be held by the slicer over the receptacle into which the slices are to be placed, while operating the device to cut the fruit or vegetable in the desired manner.

A still further object of the invention is to provide a slicer of the above described character having a novel blade unit which is detachably connected in a novel manner to supporting arms or prongs, which novel attaching means facilitates the ready removal of the blade and its replacement.

A still further object of the invention is to provide a fruit and vegetable slicing device in which the fruit or vegetable is maintained against the cutting unit and advanced toward the same by the element which effects rotation of the fruit or vegetable against a cutting blade.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in side elevation of the slicer device showing in dotted outline the position occupied by a body of fruit or a vegetable and illustrating the manner in which the resilient blade holding prongs separate upon removal of the blade.

Figure 2 is a bottom plan view of the slicer.

Figure 3 is a view in perspective of the slicer blade, per se.

Figure 4 is a detail sectional view through an end of the blade showing the attachment of a prong therewith.

Referring now more particularly to the drawing, wherein like numerals of reference designate corresponding parts throughout the several views, the numeral 1 designates generally the body of the device embodying the present invention, which comprises a handle 2 having a central longitudinal passage 3 therethrough, and a metallic ferrule 4 surrounding one end. Also constituting a portion of the body proper are the spaced parallel longitudinally directed arms or prongs 5 which are connected at their inner ends by the inwardly turned angle portions 6 with the ferrule 4. These arms are substantially parallel when they have a slicer blade, hereinafter described, connected between their free ends but, when the said blade is removed the arms or prongs tend to move apart at their free ends, as indicated by dotted lines in Figure 1. This outwardly springing tendency of the prongs facilitates the maintenance of the slicing blade in proper position when the ends of the prongs have been connected therewith.

Each prong at its free end is provided with a groove or recess 7 and each of these grooved ends positions in a slot 8 formed transversely of an end of a slicer blade, which is indicated generally by the numeral 9. This blade 9, in addition to having the transverse slots 8 at the ends thereof, is provided at its transverse center with the pointed pivot pin 10 and between this pin and a slot 8, the body of the plate is struck upwardly to form the knife 11. By regulating the distance between the sharpened edge of this knife and the top surface of the blade body 9, the thickness of the sliced material may be regulated. At the opposite side of the pin 10 from the knife 11, there are formed the struck-up points 12, which are here illustrated as 2 in number, and which are disposed on a line extending lengthwise of the plate and of the knife 11.

The blade 9 is placed in operative position by springing inwardly the free ends of the prongs 5 so as to facilitate the extension of the slotted portions through the slots 8 of the blade. When the ends of the prongs 5 are released, their natural tendency to move outwardly will effect the engagement of the outer edge of each slot 8 in a groove 7 of the prong so that the blade will be held against detachment from the prongs.

The pin 10, when the blade is in position as shown in Figure 1, is directed toward the passage 3 of the handle 2 and extending through this passage is the shaft 13 which, upon the end remote from the prongs 5, is turned to form the crank handle 14. At the end of the shaft 13 adjacent the cutting blade 9 is secured a disc 15 which occupies a plane parallel with the blade 9 and which has the face opposing the blade 9 provided with a number of ribs or cleats 16 which are designed to bite into a body of fruit or a vegetable so as to hold it firmly in position upon the blade 9 in the manner illustrated in dotted lines in Figure 1, the dotted outline of a fruit or vegetable being designated by the numeral 17.

In the operation of the present slicer, the shaft 13 is moved longitudinally through the handle 2 so as to separate the disc 15 from the blade 9 and make room for the placing of a fruit or vegetable between the disc and the plate or cutting blade. Assuming that a potato is to be sliced, the latter will be placed over the blade 9 against the point of the pivot pin 10 and the shaft 13 will then be shifted longitudinally in the opposite direction so as to force the cleats 16 into the opposite side of the same and force the potato onto the prong 10. By rotating the shaft 13, the potato will then be forced to rotate on the prong or pin 10 against the sharp edge of the slicing knife 11 so that a slice or chip will be cut by the knife and will pass through the slot 18 for discharge at the opposite side of the blade. The points 12 serve to cut concentric grooves or slits in the face of the potato so that the parallel slices formed will be made of small width.

By providing the novel means illustrated and described for attaching the slicing blade 9 to the prongs 5 it will be readily apparent that this blade may be easily and quickly removed for the replacement of a new blade or a blade in which the knife 11 is of some different form or separated from the face of the plate so as to give a slice of greater or lesser thickness.

It will also be apparent that in the slicing of potatoes or other vegetables or fruits it is possible with the present device to slice the same directly into a pan in which the slices are to be cooked so that one operation may be carried out in slicing and placing the material in the pan, instead of two or more, as would be necessary if the slicing were done with an ordinary paring knife where it is usual to cut the pieces into a bowl or other receptacle and then transfer them to the cooking pan, as it will be obvious that in the frying of sliced potatoes where a pan of hot grease is employed, it will be necessary to place the hands so close to the pan in using a paring knife that there would be danger of splasing the grease onto the hands, whereas in the present device the potato may be sliced directly into the pan without having to place the hands so close thereto as to endanger them with the flying or splattering grease.

We claim:—

1. A slicer comprising a handle, a pair of spaced prongs connected with the handle, a flat article supporting body disposed between said prongs, a cutting blade carried by the body with a cutting edge in spaced parallel relation therewith, means for detachably coupling said body between the ends of said prongs, means adjacent an end of said knife forming a rotary center for a body of fruit or a vegetable on the body, and means for simultaneously holding the fruit or vegetable on said centering means and effecting its rotation about the same and in contact with the blade.

2. A slicer comprising a handle having a longitudinal passage therethrough, a pair of elongated resilient prongs extending from one end of the handle and normally maintaining spaced parallel relation, an elongated blade, a slot at each end of said blade and adapted to receive an end of a prong, each prong having a groove therein for engagement with an edge of a slot, the prongs normally tending to move apart and thereby maintaining the blade tight between the same, a pin mounted upon the blade at the transverse center of the same and alining with said handle passage, a knife struck up from the blade between the pin and an end of the blade, a shaft extending through said handle passage for rotation and reciprocation therein, means upon the end of the shaft adjacent the blade for engaging a fruit or vegetable to effect said rotation of the latter on a pin against the knife, and a crank at the opposite end of the shaft.

3. A slicer comprising a handle having a longitudinal passage therethrough, a pair of prong members secured to one end of the handle and extending forwardly therefrom and in spaced parallel relation, an elongated blade, means at each end of said blade facilitating the detachable connection of an end of a prong therewith, a pin member at the transverse center of the blade and in alinement with said handle passage, a knife struck upwardly from the blade between the pin and an end of the blade, a shaft extending through said handle passage for rotation and longitudinal movement therein, means upon the end of the shaft adjacent the blade for holding a fruit or vegetable to effect its rotation on the pin and against the knife, crank means at the opposite end of the shaft for effecting the rotation of the latter, and a pair of spaced upstanding cutting pins disposed upon the blade at the opposite side of the centering pin from the knife.

4. In a slicer, a handle, a pair of resilient prongs carried in spaced relation by the handle, a plate member, coacting means between the member and said prongs effecting a locking engagement between the two, said prongs having an inherent resiliency acting to maintain said locking engagement, a shaft rotatably carried by the handle and directed toward the center of said member, a centering point carried by the member and directed toward an end of said shaft, a cutting blade carried by the plate and having an end adjacent said point, means facilitating the rotation of the shaft, and means carried by the shaft for engaging a body of fruit or a vegetable to effect its rotation.

EWING H. TAYLOR.
ELBERT L. PARDUE.
PORTER DUNLAP.
STERLING O. EDMONDS.